United States Patent [19]
Sargeant et al.

[11] Patent Number: 6,127,062
[45] Date of Patent: Oct. 3, 2000

[54] END CAP SEAL ASSEMBLY FOR AN ELECTROCHEMICAL CELL

[75] Inventors: Sean A. Sargeant, Westford; William H. Gardner, North Easton; John Hession, Braintree, all of Mass.

[73] Assignee: Duracell Inc, Bethel, Conn.

[21] Appl. No.: 09/047,264

[22] Filed: Mar. 24, 1998

[51] Int. Cl.$^7$ ................................................ H01M 2/12
[52] U.S. Cl. .............................. 429/53; 429/56; 429/72
[58] Field of Search ................................ 429/53, 56, 57, 429/54, 55, 72, 82, 93, 163, 185

[56] References Cited

U.S. PATENT DOCUMENTS

| | | | |
|---|---|---|---|
| 3,218,197 | 11/1965 | Carmichael et al. | 429/122 |
| 3,219,488 | 11/1965 | Southworth | 429/53 |
| 3,314,824 | 4/1967 | Spanur | 429/53 |
| 3,617,386 | 11/1971 | Bosben et al. | |
| 4,227,701 | 10/1980 | Tsuchida et al. | 429/53 |
| 4,237,203 | 12/1980 | Tsuchida et al. | 429/122 |
| 4,476,200 | 10/1984 | Markin et al. | 429/56 |
| 4,537,841 | 8/1985 | Wiacek et al. | |
| 4,581,304 | 4/1986 | Beatty et al. | 429/56 |
| 5,080,985 | 1/1992 | Wiacek et al. | |
| 5,491,038 | 2/1996 | DePalma et al. | |
| 5,532,081 | 7/1996 | DePalma et al. | |
| 5,543,246 | 8/1996 | Treger | |
| 5,554,455 | 9/1996 | Inoue | |
| 5,589,293 | 12/1996 | Pope | |
| 5,612,151 | 3/1997 | Hughen | |
| 5,614,333 | 3/1997 | Hughen et al. | |
| 5,691,073 | 11/1997 | Vu | |

FOREIGN PATENT DOCUMENTS

| 1204153 | 5/1986 | Canada . |
|---|---|---|

*Primary Examiner*—Maria Nuzzolillo
*Assistant Examiner*—Monique Wills
*Attorney, Agent, or Firm*—Barry D. Josephs; Paul I. Douglas; Thomas G. Krivulka

[57] ABSTRACT

An end cap seal assembly for an electrochemical cell such as an alkaline cell is disclosed. The end cap assembly comprises a convoluted end cap disk which may also function as a cell terminal and an underlying insulating disk also having a convoluted surface. The convoluted end cap disk has a downwardly extending wall with at least one aperture therethrough which preferably faces the ambient environment. The insulating disk has a downwardly extending wall forming a rupturable membrane which underlies and abuts the inside surface of the downwardly extending wall of the end cap. The rupturable membrane underlies and abuts the aperture in the downwardly extending wall of the end cap. When gas pressure within the cell exceeds a predetermined level the rupturable membrane pushes through said aperture and ruptures allowing gas to escape therefrom directly to the environment. A separate terminal plate may be welded to a portion of the top surface of the convoluted end cap. The conductive layer of a film-laminate condition tester may be connected to the terminal plate.

32 Claims, 4 Drawing Sheets

END CAP SEAL ASSEMBLY FOR AN ELECTROCHEMICAL CELL

FIELD OF THE INVENTION

The invention relates to an end cap assembly for sealing electrochemical cells, particularly alkaline cells. The invention relates to rupturable devices within the end cap assembly which allow gas to escape from the interior of the cell and to end cap assemblies which provide a good contact surface for condition testers integrated into the label for the cell.

BACKGROUND

Conventional electrochemical cells, such as alkaline cells, are formed of a cylindrical housing having an open end. After the cell contents are supplied, the cell is closed by crimping the housing edge over the end cap assembly to provide a seal for the cell. The end cap assembly comprises an exposed end cap plate which functions as a cell terminal and typically a plastic insulating member which insulates the end cap plate from the cell housing. A problem associated with design of various electrochemical cells, particularly alkaline cells, is the tendency of the cell to produce gases as it continues to discharge beyond a certain point, normally around the point of complete exhaustion of the cell's useful capacity. Electrochemical cells, particularly alkaline cells, are conventionally provided with rupturable diaphragms or membranes within an end cap assembly for the cell's casing. The rupturable diaphragm or membrane may be formed within a plastic insulating member as described, for example, in U.S. Pat. No. 3,617,386. Such diaphragms are designed to rupture when gas pressure within the cell exceeds a predetermined level. The end cap assembly may be provided with vent holes for the gas to escape when the diaphragm or membrane is ruptured. The end cap assembly disclosed in this reference uses considerable space above the rupturable diaphragm which reduces the amount of available space within the cell for active material. Also, the end cap assembly disclosed in the reference is not designed to withstand radial compressive forces and will tend to leak when the cell is subjected to extremes in hot and cold climate.

In order to provide a tight seal the prior art discloses end cap assemblies which include a metal support disk inserted between the end cap plate and an insulating member such as a plastic grommet which electrically insulates the metal support disk from the cell casing. The metal support disk may have a convoluted surface as shown in U.S. Pat. Nos. 5,532,081 or 5,080,985 which assures that end cap assembly can withstand high radial compressive forces during crimping of the cell's housing edge around the end cap assembly. Such support disk allows the radial forces to be maintained. This results in a tight mechanical seal around the end cap assembly at all times.

Also, the prior art discloses rupturable vent membranes which are integrally formed as part of an insulating member included within the end cap assembly. Such vent membranes are typically in the form of a rupturable disk which lies in a plane perpendicular to the cell's longitudinal axis, for example, as shown in U.S. Pat. No. 4,537,841. As shown in this reference the rupturable disk shaped membrane is integrally formed as a thin portion forming a part of an insulating grommet. Also, as shown in this reference, there is sufficient free space above the rupturable disk to allow the disk to rupture cleanly and allow gas to escape there through. The rupturable thin portion within the insulating member may also take the form of a circumferential vent membrane integrally formed within the insulating grommet as disclosed in U.S. Pat. No. 5,080,985. The circumferential membrane forms the thin portion of the insulating grommet. Such membrane may have a grooved edge to facilitate rupture of the membrane when gas pressure within the cell exceeds a predetermined value. Such rupturable vent membranes whether disk or circumferential in shape or in the form of grooved thin portions are characterized by being supported by heavier, thicker structure of the insulating grommet which immediately surrounds the rupturable membrane portions.

Recently condition testers for electrochemical cells, for example alkaline cells, have been integrated into the label for the cell to form a label/tester composite which is attached to the cell housing. The condition tester may typically be a thermochromic tester, but alternatively it may be an electrochromic tester, electrochemical tester, coulometric tester or equivalent which is attached to the inside surface of the label. The condition tester may have an electrically conductive layer therein. When the ends of the conductive layer are pressed into contact with the cell terminals the conductive layer reaches an equilibrium temperature which is a function of the cell voltage. If the conductive layer becomes hot enough it causes a thermochromic layer of the tester to change appearance thereby giving the viewer a visual indication of whether the cell is strong or weak. A label/tester composite employing a thermochromic type tester for attachment to the cell housing is described in U.S. Pat. Nos. 5,612,151 and 5,614,333.

When the label/tester composite is to be applied to conventional alkaline cells, one end of the conductive layer must be either permanently electrically connected to the terminal end cap or else allowed to be manually pressed into electrical contact with the end cap. In U.S. Pat. No. 5,614,333 an embodiment of the label/tester is shown wherein an end of the conductive layer is intended to be manually pressed into contact with the terminal end cap. That conductive end is separated from the terminal end cap by an electrically insulating layer having apertures therethrough. To activate the tester the conductive end is manually pressed through these apertures to contact the terminal end cap by applying finger pressure to the label portion thereover. A ring may be inserted as a separate piece between the peripheral edge of the terminal end cap and the cell's housing to provide a contact platform for the conductive layer or leads emanating therefrom as described in U.S. Pat. No. 5,491,038. Alternatively, an end of the tester's conductive layer may be permanently secured to the cell's terminal end cap using a conductive adhesive as described in U.S. Pat. No. 5,543,246. Commonly assigned U.S. patent application Ser. No. 08/897,918 filed Jul. 21, 1997 discloses a terminal end plate with a nonuniform surface and having a flat portion to which may be connected the conductive layer of a condition tester integrated into the label for the cell.

Accordingly, it is desirable to have an end cap assembly which provides a tight seal for the cell even though the cell may be exposed to extremes in both hot and cold climate and wherein the end cap assembly occupies a minimal amount of space within he cell so that additional active material may be added to the cell to increase capacity.

It is also desirable to have a rupturable venting mechanism which occupies minimal amount of space within the cell and which can be readily manufactured so that venting occurs at a desired predetermined pressure.

It is desirable to have a terminal end cap with a portion of its surface of structure providing good electrical contact with the conductive portion of a label/tester composite regardless of whether permanent or manual contact is desired.

SUMMARY OF THE INVENTION

The invention is directed to an electrochemical cell, for example an alkaline cell, comprising an end cap seal assembly inserted into the open end of a cylindrical housing for the cell. In one aspect the end cap assembly comprises an end cap disk and an insulating disk member (insulating grommet) underlying the end cap disk. The insulating disk electrically insulates the terminal end cap from the cell housing. The end cap disk is formed of a single piece metallic construction having a convoluted surface. The end cap disk may be exposed and may function as a cell terminal. The end cap disk has a downwardly extending wall which extends downwardly from a high point on the surface of the end cap and towards a lower point on said surface which is closer to the cell interior. The insulating disk has a convoluted surface. It has a thick region near the center forming a boss and also has a downwardly extending wall which extends downwardly from a high point on the surface of the insulating disk and towards a lower point on said surface which is closer to the cell interior. The downwardly extending wall of the insulating disk underlies and preferably abuts and contacts a portion of the inside surface of the downwardly extending wall of said terminal end cap. The downwardly extending wall of said end cap disk has at least one aperture therethough and a portion of the downwardly extending wall of the insulating disk forms a rupturable membrane which abuts the aperture in the end cap disk. Preferably the rupturable membrane contacts a portion of the inside surface of the end cap disk immediately adjacent the aperture. The aperture and underlying rupturable membrane may be visible from the cell exterior. When gas pressure within the cell reaches a predetermined level the rupturable membrane underlying the aperture extrudes through the aperture and ruptures thereby releasing gas directly into the surrounding environment through said aperture. It is preferable to locate the rupturable membrane on a downwardly extending wall of the insulating disk. However, the rupturable membrane could also be located on another portion of the insulating disk surface, for example, within a portion of the surface of the disk lying perpendicular or at any other angle to the cell's longitudinal axis provided that gas can pass unobstructed from the cell interior to the environment when the membrane ruptures.

The end cap disk has a depressed central portion, preferably with a central aperture therethrough. The end cap surface preferably has two oppositely curved portions forming a pair of oppositely curved ribs one on either end of said downwardly extending wall of the end cap disk. The rib closer to the center of the insulating disk is curved outwardly, i.e., convex and the other rib is curved inwardly, i.e., concave.

In another aspect the end cap assembly has similar construction but includes a separate terminal plate over the convoluted end cap disk aforementioned. The terminal plate may be welded to a portion of the surface of said convoluted end cap. The terminal plate desirably has a flat annular portion for connecting the conductive layer of a condition tester integrated into the label for the cell. There may be an insulating washer between the peripheral edge of the terminal plate and the peripheral edge of the cell housing. As aforementioned, the convoluted end cap disk has a downwardly extending wall with at least one aperture therethrough and the insulating disk has at least one downwardly extending wall abutting the inside surface of the downwardly extending wall of the end cap disk. A portion of the downwardly extending wall of the insulating disk forms a rupturable membrane which abuts the aperture in the end cap disk. Preferably, the rupturable membrane contacts a portion of the inside surface of the end cap disk immediately adjacent the aperture. When gas pressure within the cell reaches a predetermined level the rupturable membrane underlying the aperture extrudes through the aperture and ruptures thereby releasing gas directly into the surrounding environment through said aperture. It is preferable to locate the rupturable membrane on a downwardly extending wall of the insulating disk. However, the rupturable membrane could also be located on another portion of the insulating disk surface, for example, within a portion of the surface of the disk lying perpendicular or at any other angle to the cell's longitudinal axis provided that gas can pass unobstructed from the cell interior to the environment when the membrane ruptures.

BRIEF DESCRIPTION OF THE DRAWINGS

The invention will be better understood with reference to the drawings in which.

DETAILED DESCRIPTION

Figure 1:
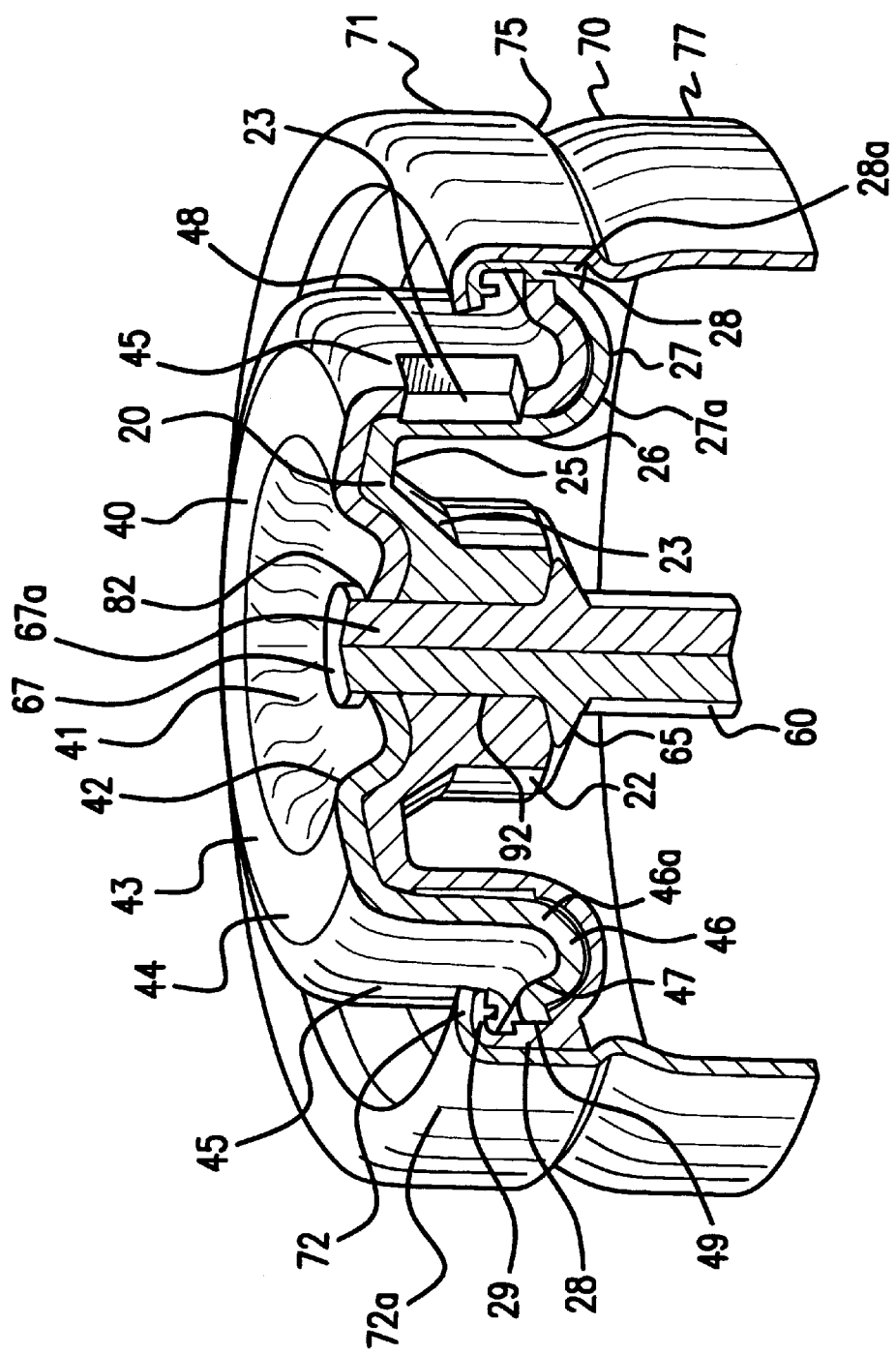
FIG. 1 is a cut-away view in perspective of the end cap assembly of the invention.
Figure 3:
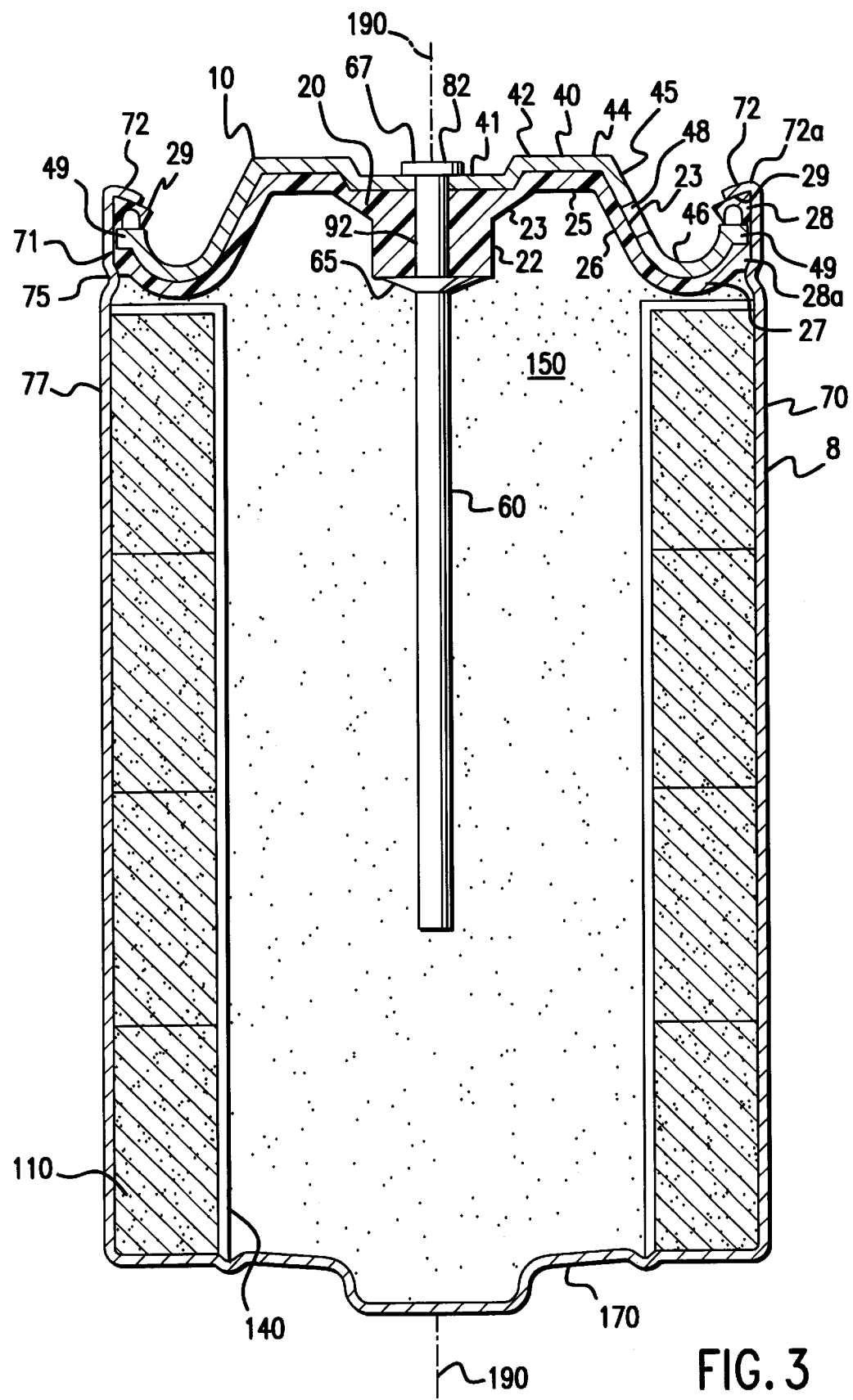
FIG. 3 is a cross section of an alkaline cell containing an end cap assembly of the invention.

A preferred structure of the end cap assembly 10 of the invention is illustrated in FIG. 1. A specific embodiment of the end cap assembly 10 integrated into an alkaline cell 8 is illustrated in FIG. 3. The end cap assembly 10 provides a seal for the open end of cell housing 70 and also has incorporated therein exposed end cap 40 of the invention. End cap 40 is in the form of a disk having a convoluted surface. End cap 40 may function as one of the cell's terminal's (negative terminal for alkaline cell) as shown in FIG. 3. The end cap 40 is also preferably of a structure causing it to function as a radial spring. This allows the end cap assembly 10 to withstand high radial compressive forces when the cell's housing 70 is crimped around the end cap assembly and provides a tight seal even though the cell may be exposed to extremes in cold and hot environmental temperature. The end cap assembly 10 of the invention occupies less space within the cell than conventional high compressive end cap assemblies for alkaline cells. This allows for inclusion of additional anode and cathode active material to increase cell capacity.

Figure 2:
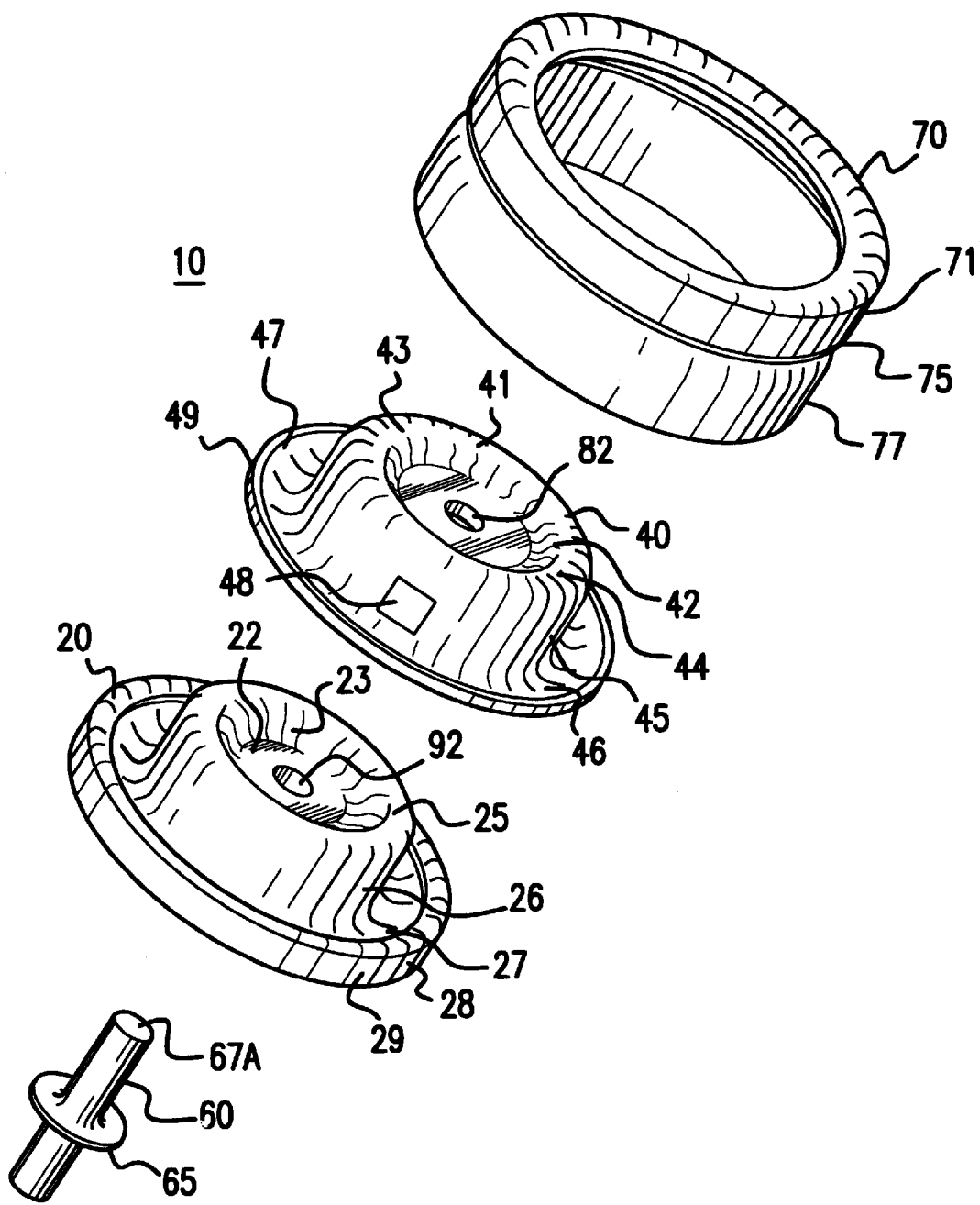
FIG. 2 is an exploded view showing a preferred embodiment of the components of the end cap assembly.

End cap assembly 10 of the invention as best illustrated in FIGS. 1–3 is comprised of a an end cap disk 40, an electrically insulating member 20, and elongated current collector 60. The insulating member 20 is preferably in the form of an insulating disk (grommet). Insulating disk 20 and end cap disk 40 have an aperture 92 and 82, respectively, through their respective central portions for receiving a metal current collector 60. Preferably the head of the current collector has a flange 65 which acts as a seat for the base of insulating disk 20. Thus, when assembling the end cap assembly current collector 60 may be inserted through aperture 92 of insulating disk 20 until flange 65 of the current collector comes to rest against the base of the central thicker portion of disk 20 forming boss 22. The end cap 40 is inserted over insulating disk 20 so that the head 67a (FIG. 2) of current collector 60 protrudes through aperture 82 of the end cap. The head 67a of the current collector is formed to fit through aperture 82 of end cap 40 and then a nub 67 at head 67a is formed which is of greater diameter than the aperture 82. Nub 67 may be formed by hammering head 67a against depressed central portion 41 of end cap 40 after head 67a is inserted through aperture 82. The central portion 41 of end cap disk 40 and boss 22 of insulating disk 20 are held pressed together between nub 67 and flange 65 as illustrated best in FIG. 1.

The end cap disk 40 surface is convoluted. End cap 40 is desirably convoluted to the shape shown best in FIGS. 1 and 2. It has a depressed central portion 41 with central aperture 82 therethrough. Central portion 41 forms a crater having a first upwardly extending wall 42. Wall 42 terminates in a flat surface having curved edges forming first annular rib 44 as illustrated in FIG. 3. A downwardly extending wall 45 extends from the outer circumferential edge of first annular rib 44. Wall 45 may be vertical, that is, parallel to the longitudinal axis 190 of the cell. Preferably wall 45 extends outwardly at an angle of between about 0 and 45 degrees from vertical. Wall 45 (FIG. 1) terminates in a curved surface 46a which forms an annular trough defining second annular curved rib 46. Wall 45 has at least one aperture 48 therethrough. Aperture 48, may be of various shape, preferably circular, oval, rectangular or parallelepiped. Curved rib 46 terminates in end flange 49 which forms the edge of end cap disk 40. The first and second annular ribs 44 and 46, respectively, have opposite curvature. When viewed from outside the cell rib 44 is curved outwardly, i.e., convex and rib 46 is curved inwardly, i.e., concave, as illustrated in FIG. 1. The oppositely curved ribs 44 and 46 terminate in common wall 45 therebetween.

Insulating disk 20 may be formed of a single piece construction of plastic insulating material; preferably it is molded by injection molding nylon 66 which is durable and corrosion resistant. As illustrated best in FIGS. 1 and 2, insulating disk 20 has a central boss 22 with aperture 92 through the center thereof. Boss 22 forms the thickest and heaviest portion of disk 20. The peripheral edge of boss 22 terminates in first upwardly extending arm 23 which curves inwardly (FIG. 1) to form a first annular curved rib 25. Rib 25 terminates in a downwardly extending wall 26. Wall 26 preferably forms the same angle with longitudinal axis 190 as downwardly extending wall 45 of end cap plate 40 so walls 26 and 45 are parallel to one another when the end cap assembly is formed. Downwardly extending wall 26 terminates in a curved bottom 27a which forms second annular curved rib 27. Rib 27 terminates in an upwardly extending peripheral edge 28 which forms the circumferential edge of disk 20. Annular ribs 25 and 27 have opposite curvature. When viewed from outside the cell, annular rib 25 is curved outwardly, i.e., convex, and annular rib 27 is curved inwardly, i.e., concave as illustrated in FIG. 1. During assembly when end cap 40 is inserted onto the surface of disk 20, rib 25 fits within the curved area of rib 44 and rib 46 fits within the curved area of rib 27 as shown in FIG. 1. Preferably, downwardly extending wall 26 of insulating disk 20 lies flush against the inside surface of downwardly extending wall 45 of end cap 40.

A small rupturable membrane portion 23 of wall 26 underlies aperture 48 and is visible through aperture 48. The thickness of rupturable portion 23 may be made the same as the thickness of downwardly extending wall 26 or the thickness of membrane portion 23 may be adjusted to be somewhat smaller or larger than the thickness of the remaining portion of wall 26. The size of aperture 48 and the thickness of underlying rupturable membrane 23 can both be adjusted so that the membrane 23 will extrude through aperture 48 and rupture when gas pressure within the cell reaches a predetermined level. When insulating disk 20 and integrally formed wall 26 is formed preferably of nylon 66, it has been determined that the thickness of membrane 23 may advantageously be between about 0.05 mm and 0.40 mm and the diameter of aperture 48 may be between about 2.0 and 8.0 mm or the cross sectional area of aperture 48 may be between about 3 mm$^2$ and 50 mm$^2$. For AAAA, AAA, AA, C and D size cells a preferred thickness of wall 26 is between about 0.30 mm and 0.80 mm. The preferred thickness of rupturable portion 23 is about between about 0.20 mm and 0.40 mm. With such thickness it has been determined to be advantageous to set the aperture to a circular configuration having a diameter of between about 3.0 mm and 5.0 mm. Such combination will allow membrane portion 23 to extrude through aperture 48 and rupture when the gas pressure within the cell reaches a level of about 800 psig ($5.4 \times 10^6$ pascal). If the cell is an AA alkaline cell, membrane portion 23 of nylon 66 may desirably have a thickness of about 0.3 mm and circular aperture 48 a diameter of about 4 mm. With such combination membrane portion 23 will rupture when gas pressure within the cell reaches about 1000 psig ($6.75 \times 10^6$ pascal). If the cell is a D alkaline cell, membrane portion 23 of nylon 66 may desirably have a thickness of about 0.4 mm and circular aperture 48 a diameter of about 8 mm. With such combination membrane portion 23 will rupture when gas pressure within the cell reaches about 500 psig ($3.38 \times 10^6$ pascal). It should be appreciated that aperture 48 is not intended to be limited to any particular shape and other shapes, for example, square, oval, rectangular, parallelepiped or of irregular shape having nonparallel opposing sides, e.g., star or triangular shapes, for aperture 48 are also suitable. Such other configurations for aperture 48 may have comparable width or cross-sectional area to the above mentioned circular configuration. It should also be appreciated that while nylon 66 is a preferred material for insulating disk 20 and integral rupturable membrane portion 23, other materials, preferably hydrogen permeable, corrosion resistant, durable plastic material may also be suitable in the present application. For example, insulating disk 20 and rupturable membrane portion 23 may be formed of polypropylene, talc filled polypropylene, sulfonated polyethylene or other polyamide (nylon) grades. The combination of membrane 23 thickness and aperture 48 size may be adjusted depending on the material employed and level of gas pressure at which rupture is intended. It has been determined to be adequate to employ only one aperture 48 and corresponding one rupturable membrane 23. However, downwardly extending wall 45 may be provided with a plurality of comparably sized apertures with plurality of underlying rupturable membrane portions 23 integral to wall 26 of size and thickness above described. This would provide additional assurance that membrane rupture and venting would occur at the desired gas pressure. It is preferable to have rupturable membrane 23 pressing flush against the bottom surface of downwardly extending wall 45 so that it directly underlies aperture 48. It is preferable to locate the rupturable membrane 23 on downwardly extending wall 26 of the insulating disk 20, since such location permits gas to pass unobstructed from the cell to the environment even when the cell is connected to another cell or a device being powered. However, rupturable membrane 23 could also be located on another portion of the insulating disk surface, for example, within a flat portion of the disk surface, i.e., oriented perpendicular to longitudinal axis 190. Similarly, the abutting aperture 48 within the end cap surface through which the membrane ruptures could also be located on another portion of the end cap 40, for example, on a portion of the end cap 40 surface oriented perpendicular to longitudinal axis 190. Such alternative locations are feasible provided the gas can pass freely into the surrounding environment from such locations even when the cell is connected to another cell or device being powered.

An advantage of the end cap assembly 10 of the invention is that aperture 48 provides both a ventable passageway for gas to escape from the interior of the cell and at the same time provides a vent hole through which gas may escape directly to the environment. This obviates the need for a separate vent hole to allow gas to escape from the end cap assembly once membrane 23 ruptures. Another advantage of the invention as illustrated in FIGS. 1–3 is that end cap disk 40 functions as both a cell terminal and metal support disk which can withstand high radial compressive forces and in effect functions as a radial spring thereby assuring a tight seal regardless of whether the cell is exposed to extremes in hot and cold climate.

The end cap assembly 10 of the invention is preferably inserted into the open end of an alkaline cell. A housing of a casing of a representative alkaline cell is shown in FIG. 3. Such alkaline cells have a cylindrical housing (casing) 70 initially formed with one end 170 closed and the opposite end open. Alkaline cells have an anode comprising zinc, a cathode comprising manganese dioxide, an electrolyte of potassium hydroxide and a separator material, typically comprising rayon or cellulose. After the cell is filled with anode and cathode active material, an end cap assembly 10 is ready for insertion into the open end to seal the cell.

Materials of construction for housing 70 may preferably be nickel plated steel. End cap 40 is constructed of a conductive metal having good mechanical strength and corrosion resistance such as nickel plated cold rolled steel or stainless steel, preferably, nickel plated low carbon steel. Insulating disk 20 and integral rupturable membrane 23 may be composed of a durable, corrosion resistant plastic which is permeable to hydrogen and which at appropriate thickness forms a rupturable membrane. Insulating disk 20 and integral rupturable membrane 23 may be composed of a polyamide (nylon), preferably nylon 66. Alternatively, insulating disk 20 and membrane 23 may be composed of polypropylene, talc filled polypropylene, sulfonated polyethylene or other polyamide (nylon) grades. Current collector 60 can be selected from a variety of known electrically conductive metals found to be useful as current collector materials, for example, brass, tin plated brass, bronze, copper or indium plated brass.

In manufacture once the end cap 40 is secured to insulating disk 20 by current collector 60 to form assembly 10 as above described, assembly 10 may then be fitted into the open end of a filled cell housing 70 (FIG. 3). End cap assembly 10 is inserted into cell 8 so that the bottom portion 28a of peripheral edge 28 rests on circumferential bead 75. Bead 75 is formed by a circumferential indentation in the surface of cell housing 70 near the open end of the cell. Circumferential bead 75 provides a shelf on which the peripheral edge 28 of the insulating disk 20 may rest. The peripheral edge 72 of housing 70 is crimped over the peripheral edge 28 of insulating disk 20 to lock the end cap assembly in place vertically, that is, to keep it from movement in the direction of longitudinal axis 190. Crimped peripheral edge 72 forms cell shoulder 72a along the line of crimp. The end cap assembly 10 may then be subjected to radial crimping wherein mechanical force is applied to portion 71 (FIG. 3) of the cell housing above bead 75. Such radial force may be applied by pushing a die over surface 71 from edge 72 to bead 75. Initially, the diameter of housing at surface 71 above bead 75 is greater than the diameter of the body of the housing 77 below bead 75. As radial force is applied, surface 71 is compressed inwardly causing the peripheral edge 49 of end cap disk 40 to bite into the peripheral edge 28 of insulating disk 20. As radial force is applied, the convoluted surface of end cap 40 allows downwardly extending wall 45 of end cap 40 to become inwardly flexed so that end cap 40 becomes radially compressed. End cap 40 functions as a radial spring, that is, maintains its radial compression and results in a tight seal even though the cell may be subjected to extremes in cold or hot climate.

Figure 4:
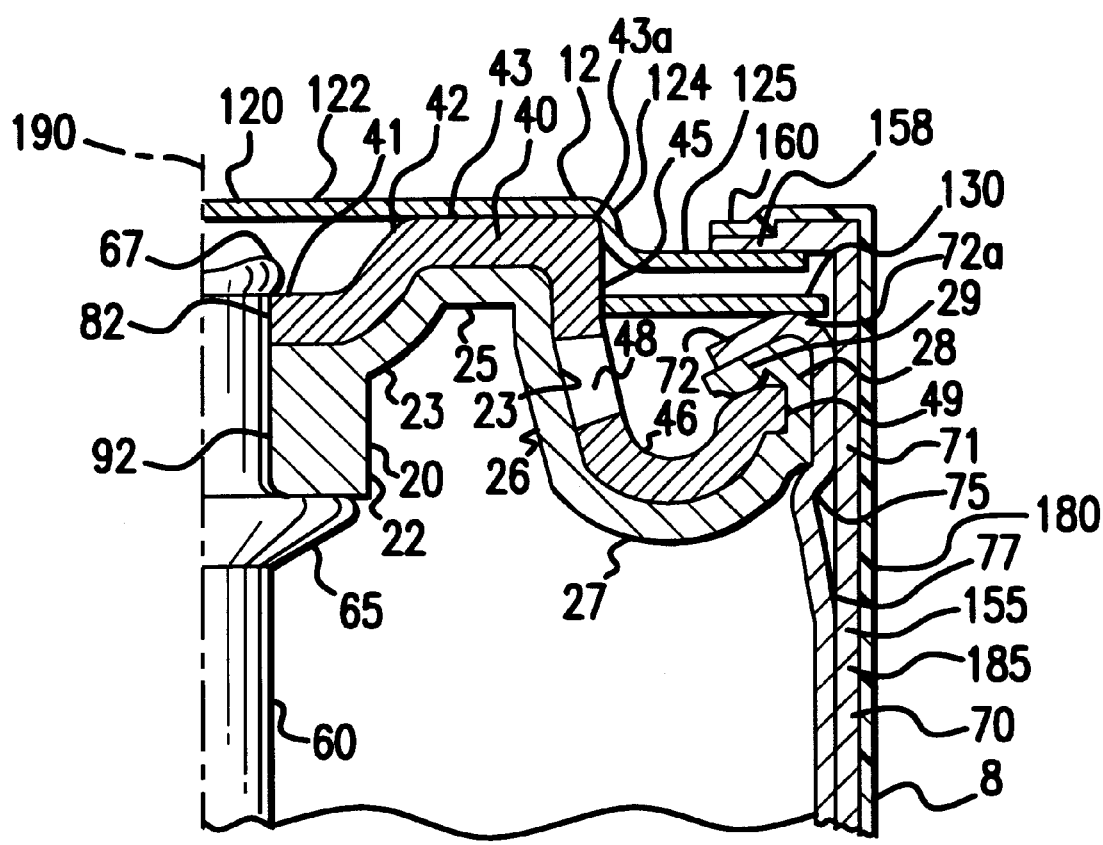
FIG. 4 is a cross section of another embodiment of the end cap assembly of the invention.

Another embodiment of the invention is shown as end cap assembly 12 in FIG. 4. End cap assembly 12 comprises a separate terminal plate 120, convoluted end cap disk 40, insulating disk 20, current collector 60 and insulating washer 130. The structure and structural relationship of end cap disk 40, insulating disk 20 and current collector 60 are essentially the same as that shown and described with reference to the embodiment shown in FIG. 1. Terminal plate 120 functions as one of the cell's terminal's (negative terminal for alkaline cell) and is of a structure which permits a condition tester 155 to be easily electrically connected thereto. The condition tester 155 is integrated into the label 180 for the cell to form a tester/label composite 185 (FIG. 4). As above described, downwardly extending wall 26 of insulating disk 20 abuts the inside surface of downwardly extending wall 45 of end cap 40. As described above there is a rupturable membrane portion 23 of wall 26 which extrudes through aperture 48 in wall 45 and ruptures when gas pressure within the cell exceeds a predetermined level. However, in the alternate embodiment shown in FIG. 4 a separate terminal plate 120 is welded to the raised flat surface portion 43 of end cap disk 40. In this embodiment the current collector 60 may pass only through aperture 92 in boss 22 of insulating disk 20 and through aperture 82 in end cap disk 40 and preferably does not pass through any portion of terminal plate 120. Terminal plate 120 is formed of a single plate or disk which has a flat surface 122 extending from the center of disk 120 to a point which corresponds to edge 43a of flat surface 43 as shown in FIG. 4. At that point the surface 122 is beveled downwardly by downwardly extending wall 124 which terminates in a flat lower surface 125 preferably parallel to surface 122. Flat surfaces 122 and 125 may be perpendicular to the cell's longitudinal axis. Flat surface 125 forms the peripheral edge of terminal plate 120. An insulating washer 130, which may be formed of plastic or heavy paper or cardboard, is placed between peripheral edge 125 of terminal plate 120 and the peripheral edge 72 of housing 70 to electrically insulate terminal plate 120 from housing 70. Washer 130 is preferably composed of plastic coated paper, e.g. polyethylene coated paper of overall thickness between about 0.2 and 0.5 mm. The above mentioned thickness for rupturable membrane 23 and size and shape of aperture 48 with respect to the embodiment shown in FIG. 1 apply as well to the embodiment shown in FIG. 4. In general, materials of construction, structure and size descriptions for like numbered elements in FIG. 4 may be the same as those described with respect to FIG. 1. End plate 120 may be of the same metal composition as end cap 40, preferably nickel plated cold rolled steel or stainless steel.

The embodiment shown in FIG. 1 and 4 may accommodate a film-laminate condition tester for the cell. However, the embodiment shown in FIG. 4 is particularly suitable for such application, since it provides a flat conductive surface 125 adjacent peripheral edge 72 of housing 70. Such surface provides a very suitable contact point for film-like conductive layers or other conductive elements which emanate from the condition tester. Such conductive element must be either permanently connected to terminal plate 120 or else be in close proximity to terminal plate 120 so that it may be manually pressed into contact therewith.

A condition tester for a cell can be integrated into the cell label 180 so that it lies wedged between the label and housing 70. The condition tester may preferably be a thermochromic type tester for the cell as described in U.S. Pat. Nos. 5,612,151 or 5,614,333 herein incorporated by reference. Such tester is shown schematically as tester 155 (FIG. 4) integrated into label 180 which is wrapped around the cell. Tester 155 has an electrically conductive layer shown schematically as conductive layer 158 (FIG. 4). There is an electrically insulating layer (not shown) between the conductive layer 158 and housing 70. A detailed design for tester 155 is described in the above two referenced patents. When the ends of the conductive layer 158 or leads emanating therefrom are pressed into contact with the cell terminals heat is generated through the conductive layer. (The term "conductive layer" as used hereinafter and in the claims is intended to include an electrically conductive coating or conductive film as well as an electrically conductive coating or conductive film having conductive leads emanating therefrom.) The equilibrium surface temperature at any point along the conductive layer is a function of the watt density (power consumed per unit of conductive layer surface area). This in turn is a function of the cell voltage at time of testing. If the cell voltage is high enough the conductive layer will reach an equilibrium temperature sufficiently high to cause a change in color or appearance of an overlying thermochromic layer. This gives the viewer a visual effect enabling him to determine whether the cell is weak or strong. In such tester one end of the conductive coating may be in permanent electrical contact with the negative terminal 120 of alkaline cell 8 (FIG. 4). Alternatively, one end of the conductive layer may lie close to the terminal 120 but not actually contacting the terminal until finger pressure is applied to the portion of the label 180 overlying that end of the conductive layer. In either case if the tester 155 is integrated into a label 180 applied to a conventional alkaline cell 8, it is preferable that the contact surface 125 (FIG. 4) for the conductive layer 158 at the cell's negative terminal be flat. Other condition testers which are integrated into the cell label may also be used with the present invention as long as they have an electrically conductive layer which must be electrically connected to terminal 120. For example, the tester may be an electrochemical tester as disclosed in U.S. Pat. No. 5,339,024 or a coulometric tester disclosed in U.S. Pat. No. 5,627,472.

The label 180 with underlying tester 155, that is label/tester composite 185, is preferably applied to the cell by applying the label around the cell housing 70 and heat shrinking the label 180 over the cell shoulders 72a. It has been determined that when contact surface 125 on terminal plate 120 is flat, more useful surface on the terminal is available for contacting conductive layer 158 and the contact is more easily and securely made. This results in more efficient and reliable contact between the conductive layer 158 and end cap terminal 120 if the tester is designed to be activated by application of manual finger pressure to region 160 of the label over the conductive layer end or alternatively if said conductive layer end is permanently welded to the end cap terminal 120 at contact surface 125.

The components comprising the end cap assembly 12 shown in FIG. 4 may be assembled and crimped within the open end of the cell as above described with respect to the end cap assembly 10 shown in FIGS. 1–3, except that after crimping the top section 71 of housing 70 over and around end cap 40 and insulating disk 20, a separate terminal plate 120 is welded to end cap 40 and an insulating washer 130 is included between terminal plate 120 and the peripheral edge 72 of housing 70. It is also possible to weld terminal plate 120 to end cap 40 and insert washer 130 after the crimping operation.

Although the present invention has been described with respect to specific embodiments, it should be appreciated that variations are possible within the concept of the invention. Accordingly, the invention is not intended to be limited to the specific embodiments described herein but will be defined by the claims and equivalents thereof.

What is claimed is:

1. In an electrochemical cell having an open ended cylindrical housing and an end cap assembly inserted therein closing said housing, said cell having a positive and a negative terminal, said end cap assembly comprising an end cap and an electrically insulating sealing member, said insulating sealing member having an elongated electrically conductive current collector passing therethrough, the current collector being in electrical contact with the end cap, said insulating sealing member electrically insulating the end cap from said housing, and the edge of said housing being crimped over the peripheral edge of said end cap to form a cell shoulder along the line of crimp, the improvement comprising:

the end cap assembly comprising an end cap, and an insulating sealing member underlying said end cap when the cell is viewed in vertical position with the end cap assembly on top, wherein the insulating member electrically insulates the end cap from the cell housing; said end cap being formed of a disk of single piece metallic construction having a convoluted surface and at least one aperture through its surface; said end cap having a depressed surface around its central longitudinal axis; said insulating member comprising an insulating disk having a nonuniform thickness and having a convoluted integral surface wherein a portion of said integral surface underlies said aperture in said end cap disk when the cell is viewed in vertical position with the end cap assembly on top, said portion of said insulating disk underlying said aperture forming a rupturable membrane, wherein said rupturable membrane abuts said aperture in said end cap, whereby when gas pressure within the cell rises said rupturable membrane penetrates through said aperture and ruptures thereby releasing gas directly into the surrounding environment through said aperture.

2. The electrochemical cell of claim 1 wherein said end cap is exposed to the environment and said end cap functions as a cell terminal.

3. The electrochemical cell of claim 1 wherein a portion of said rupturable membrane contacts said end cap disk in the region of a surface of said end cap disk immediately adjacent said aperture.

4. The electrochemical cell of claim 1 wherein said insulating disk comprises a plastic material having a downwardly extending wall which extends downwardly from a high point on the surface of the insulating disk and towards a lower point on its surface which is closer to the cell interior when the cell is viewed in vertical position with the end cap assembly on top, said end cap disk having a downwardly extending wall which extends downwardly from a high point on the surface thereof when the cell is viewed in vertical position with the end cap assembly on top, wherein the downwardly extending wall of the insulating disk underlies at least a substantial portion of the downwardly extending wall of said end cap disk, wherein said at least one aperture penetrates through said downwardly extending wall in said end cap disk, wherein a portion of said downwardly extending wall of said insulating disk forms said rupturable membrane underlying and abutting said aperture.

5. The electrochemical cell of claim 1 wherein said aperture in said end cap has a cross sectional area of between about 3 and 50 mm$^2$ and said rupturable membrane has a thickness between about 0.05 and 0.40 mm.

6. The electrochemical cell of claim 1 wherein said aperture in the end cap disk is visible from the exterior of the end cap assembly.

7. The electrochemical cell of claim 4, wherein the surface of said end cap disk has a depressed central region.

8. The electrochemical cell of claim 7 wherein said end cap has an aperture through said depressed central region and a portion of said current collector passes through said aperture, said current collector having a head portion seated on the top surface of said depressed central region when the cell is viewed in vertical position with the end cap assembly on top, wherein the diameter of said head portion is greater than the diameter of said aperture through the depressed central region.

9. The electrochemical cell of claim 8 wherein the insulating disk has a relatively thick region at its center forming a boss and wherein the central depressed region of said end cap is held pressed against said boss by the head of said current collector.

10. The electrochemical cell of claim 9 wherein the current collector has a flange portion surrounding a portion of the body of the elongated current collector, wherein said flange abuts the bottom surface of said boss, and wherein the central depressed region of said end cap disk is held pressed against said boss between the head of said current collector and said flange.

11. The electrochemical cell of claim 7 wherein the end cap disk has two oppositely curved surface portions forming a pair of oppositely curved annular ribs one of said annular ribs being curved outwardly (convex) and the other is curved inwardly (concave) when the cell is viewed in the vertical position with the end cap assembly on top, said outwardly curved (convex) rib being closer to the depressed central portion and the inwardly curved (concave) rib being closer to the peripheral edge of said end cap disk, wherein said downwardly extending wall of the end cap disk forms a common wall between said pair of annular ribs.

12. In an electrochemical cell having an open ended cylindrical housing and an end cap assembly inserted therein closing said housing, said cell having a positive and a negative terminal and a label around the cell housing, said end cap assembly comprising a terminal member and an electrically insulating sealing member, said insulating member having an elongated electrically conductive current collector passing therethrough, the current collector being in electrical contact with the terminal member, said insulating sealing member electrically insulating the end cap from said housing, and the edge of said housing being crimped over the peripheral edge of said end cap to form a cell shoulder along the line of crimp, the improvement comprising:

the end cap assembly comprising a terminal plate functioning as a cell terminal, an end cap disk of single piece metallic construction having a convoluted surface and at least one aperture therethrough, said end cap having a depressed surface around its central longitudinal axis, said end cap disk underlying said terminal plate and an insulating sealing member underlying said end cap disk when the cell is viewed in vertical position with the end cap assembly on top, wherein the insulating member electrically insulates said end cap disk from the cell housing; said insulating member comprising an insulating disk of nonuniform thickness and having a convoluted integral surface wherein a portion of said integral surface underlies said aperture in said end cap disk when the cell is viewed in vertical position with the end cap assembly on top, said portion of said insulating disk underlying said aperture forming a rupturable membrane, wherein said rupturable membrane in said insulating disk abuts said aperture in said end cap disk, whereby when gas pressure within the cell rises said rupturable membrane penetrates through said aperture and ruptures thereby releasing gas directly into the surrounding environment through said aperture.

13. The electrochemical cell of claim 12 wherein a portion of said rupturable membrane contacts said end cap disk in the region of a surface of said end cap disk immediately adjacent said aperture.

14. The electrochemical cell of claim 12 wherein said insulating disk comprises a plastic material having a downwardly extending wall which extends downwardly from a high point on the surface of the insulating disk and towards a lower point on its surface which is closer to the cell interior when the cell is viewed in vertical position with the end cap assembly on top, said end cap disk having a downwardly extending wall which extends downwardly from a high point on the surface thereof when the cell is viewed in vertical position with the end cap assembly on top, wherein the downwardly extending wall of the insulating disk underlies at least a substantial portion of the downwardly extending wall of said end cap disk, wherein said at least one aperture penetrates through said downwardly extending wall in said end cap disk, wherein a portion of said downwardly extending wall of said insulating disk forms said rupturable membrane underlying and abutting said aperture.

15. The electrochemical cell of claim 14 wherein said terminal plate has a portion of its surface flat and at about right angle to the cell's longitudinal axis and in proximity to said cell shoulder, said flat surface providing an electrical contact region for an electrically conductive layer of a condition tester for the cell.

16. The electrochemical cell of claim 15 wherein at least a portion of said tester is attached to the inside surface of said label.

17. The electrochemical cell of claim 15 wherein said flat portion of said terminal plate forms a circular annular step.

18. The electrochemical cell of claim 12 wherein a portion of said terminal plate is welded to said end cap disk.

19. The electrochemical cell of claim 12 wherein the surface of said end cap disk has a depressed central region.

20. The electrochemical cell of claim 19 wherein said end cap disk has an aperture through said depressed central region and a portion of said current collector passes through said aperture, said current collector having a head portion seated on the top surface of said depressed central region when the cell is viewed in vertical position with the end cap assembly on top, wherein the diameter of said head portion is greater than the diameter of said aperture through the depressed central region.

21. The electrochemical cell of claim 20 wherein the insulating disk has a relatively thick region at its center and wherein the central depressed region of said end cap disk is held pressed against said boss by the head of said current collector.

22. The electrochemical cell of claim 21 wherein the current collector has a flange portion surrounding a portion of the body of the elongated current collector, wherein said flange abuts the bottom surface of said boss, and wherein the central depressed region of said end cap disk is held pressed against said boss between the head of said current collector and said flange.

23. The end cap assembly of claim 14 wherein the end cap disk has a depressed central portion and two oppositely curved surface portions forming a pair of oppositely curved annular ribs one of said annular ribs being curved outwardly (convex) and the other is curved inwardly (concave) when the cell is viewed in the vertical position with the end cap assembly on top, said outwardly curved (convex) rib being closer to the depressed central portion and the inwardly curved (concave) rib being closer to the peripheral edge of said end cap disk, wherein said downwardly extending wall of the end cap disk forms a common wall between said pair of annular ribs. underlying said end cap when the cell is viewed in vertical position with the end cap assembly on top, wherein the insulating member electrically insulates the end cap from the cell housing; said end cap disk of single piece metallic construction having a convoluted surface and at least one aperture through its surface; said insulating member comprising an insulating disk having a convoluted surface wherein a portion of its surface underlies said aperture in said end cap disk when the cell is viewed in vertical position with the end cap assembly on top, said portion of said insulating disk underlying said aperture forming a rupturable membrane, whereby when gas pressure within the cell reaches a predetermined level said rupturable membrane penetrates through said aperture and ruptures thereby releasing gas directly into the surrounding environment through said aperture.

24. An end cap assembly for insertion into the open end of the cylindrical housing of an alkaline cell, the end cap assembly comprising an end cap disk, and an insulating sealing member underlying said end cap when the cell is viewed in vertical position with the end cap assembly on top, wherein the insulating member electrically insulates the end cap from the cell housing; said end cap disk of single piece metallic construction having a convoluted surface and at least one aperture through its surface; said end cap disk having a depressed surface around its central longitudinal axis; said insulating member comprising an insulating disk of nonuniform thickness and having a convoluted integral surface wherein a portion of said integral surface underlies said aperture in said end cap disk when the cell is viewed in vertical position with the end cap assembly on top, said portion of said insulating disk underlying said aperture forming a rupturable membrane, wherein said rupturable membrane abuts said aperture in said end cap disk, whereby when gas pressure within the cell rises said rupturable membrane penetrates through said aperture and ruptures thereby releasing gas directly into the surrounding environment through said aperture.

25. The end cap assembly of claim 24 wherein said end cap disk is exposed to the environment and said end cap disk functions as a cell terminal.

26. The end cap assembly of claim 24 wherein a portion of said rupturable membrane contacts said end cap disk in the region of a surface of said end cap disk immediately adjacent said aperture.

27. The end cap assembly of claim 24 wherein said insulating disk comprises a plastic material having at least one downwardly extending wall which extends downwardly from a high point on the surface of the insulating disk and towards a lower point on its surface which is closer to the cell interior when the cell is viewed in vertical position with the end cap assembly on top, said end cap disk having at least one downwardly extending wall which extends downwardly from a high point on the surface thereof when the cell is viewed in vertical position with the end cap assembly on top, wherein the downwardly extending wall of the insulating disk underlies at least a substantial portion of the downwardly extending wall of said end cap disk, wherein said at least one aperture penetrates through said downwardly extending wall in said end cap disk, wherein a portion of said downwardly extending wall of said insulating disk forms said rupturable membrane underlying and abutting said aperture.

28. The end cap assembly of claim 27 wherein the rupturable membrane has a thickness of between about 0.05 and 0.40 mm and said aperture through which it penetrates during rupture has a cross sectional area between about 3 and 50 $mm^2$.

29. The end cap assembly of claim 27 wherein the end cap disk has a depressed central portion and two oppositely curved surface portions forming a pair of oppositely curved annular ribs one of said annular ribs being curved outwardly (convex) and the other is curved inwardly (concave) when the cell is viewed in the vertical position with the end cap assembly on top, said outwardly curved (convex) rib being closer to the depressed central portion and the inwardly curved (concave) rib being closer to the peripheral edge of said end cap disk, wherein said downwardly extending wall of the end cap disk forms a common wall between said pair of annular ribs.

30. An electrochemical cell having an open end cylindrical housing and an end cap assembly inserted Wherein closing said housing, said end cap assembly comprising an end cap and an electrically insulating sealing member, said insulating sealing member electrically insulating the end cap from said housing; said insulating sealing member underlying said end cap when the cell is viewed in vertical position with the end cap assembly on top; said end cap being formed of a disk of single piece metallic construction having at least one aperture through its surface; said insulating member comprising an insulating disk wherein a portion of its surface underlies said aperture in said end cap disk when the cell is viewed in vertical position with the end cap assembly on top, said portion of said insulating disk underlying said aperture forming a rupturable membrane, whereby when gas pressure within the cell reaches a predetermined level said rupturable membrane ruptures thereby releasing gas therethrough.

31. The electrochemical cell of claim 30 wherein when gas pressure within the cell reaches a predetermined level said rupturable membrane penetrates through said aperture and ruptures thereby releasing gas therethrough.

32. The electrochemical cell of claim 31 wherein a portion of said rupturable membrane contacts said end cap disk in the region of a surface of said end cap disk adjacent said aperture.

* * * * *